(12) United States Patent  
Le et al.

(10) Patent No.: US 7,620,808 B2
(45) Date of Patent: Nov. 17, 2009

(54) SECURITY OF A COMMUNICATION SYSTEM

(75) Inventors: Franck Le, Irving, TX (US); Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 910 days.

(21) Appl. No.: 10/768,075

(22) Filed: Feb. 2, 2004

(65) Prior Publication Data

US 2005/0021939 A1 Jan. 27, 2005

Related U.S. Application Data

(60) Provisional application No. 60/479,509, filed on Jun. 19, 2003.

(51) Int. Cl.
*H04L 29/06* (2006.01)
*H04L 12/26* (2006.01)
*G06F 15/16* (2006.01)

(52) U.S. Cl. .................. 713/153; 709/227; 370/237; 370/360

(58) Field of Classification Search ................. 713/153; 370/230–237, 360, 400, 412; 709/227
See application file for complete search history.

(56) References Cited

U.S. PATENT DOCUMENTS

| | | | |
|---|---|---|---|
| 6,219,706 B1 * | 4/2001 | Fan et al. | 709/225 |
| 6,324,577 B1 * | 11/2001 | Hirai | 709/223 |
| 6,546,003 B1 * | 4/2003 | Farris | 370/352 |
| 6,745,333 B1 * | 6/2004 | Thomsen | 726/23 |
| 6,914,973 B2 * | 7/2005 | Marsico | 379/221.13 |
| 2003/0043781 A1 * | 3/2003 | Proctor et al. | 370/352 |
| 2003/0233329 A1 * | 12/2003 | Laraki et al. | 705/52 |
| 2004/0013112 A1 * | 1/2004 | Goldberg et al. | 370/389 |
| 2004/0136358 A1 * | 7/2004 | Hind et al. | 370/352 |

FOREIGN PATENT DOCUMENTS

| | | |
|---|---|---|
| EP | 0 743 777 A2 | 11/1996 |
| WO | WO 02/091700 A2 | 11/2002 |

* cited by examiner

*Primary Examiner*—Kimyen Vu
*Assistant Examiner*—Suman Debnath
(74) *Attorney, Agent, or Firm*—Alston + Bird LLP (57) ABSTRACT

Communications systems and methods for controlling transportation of data. The methods commonly include entering state information associated with a data transportation connection in a state information record maintained in a data processing entity. The data transportation connection is normally established between user equipment and a node, commonly via a gateway node, and the data processing entity is typically configured to control transportation of data based on the state information table. The methods also usually include, detecting that the data transportation connection is deactivated for the user equipment, sending information from the gateway node that the user equipment cannot be reached, and, in response to the information, deleting the state information from the state information record. The systems generally allow for implementation of the methods.

11 Claims, 2 Drawing Sheets

SECURITY OF A COMMUNICATION SYSTEM

CROSS REFERENCE TO RELATED APPLICATIONS

This application claims priority of U.S. Provisional Patent Application Ser. No. 60/479,509, entitled "Improvements in Security of a Communication System" filed on Jun. 19, 2003, the contents of which are hereby incorporated by reference in their entirety.

BACKGROUND OF THE INVENTION

1. Field of the Invention

The present specification relates generally to security of communication systems, and in particular, but not exclusively, to preventing third parties from using resources of a user.

2. Description of the Related Art

A communication system may be seen as a facility that enables communication between two or more entities such as, but not limited to, user equipment and/or other nodes associated with the system. The communication may include, for example, communication of voice, data, multimedia and so on.

In a basic communication system, a simple communication network is typically provided for linking together two or more nodes so that the nodes can communicate with each other. The communication may occur during a communication session. At least some set-up signaling is typically required in order to set-up a communication session. Communication between the user equipment and/or the entities of the communication network and/or the set-up signaling may be based on an appropriate communication protocol or protocols.

The communication may be provided by a fixed line and/or wireless communication interfaces. A feature of many wireless communication systems is that they provide mobility for the users thereof. A non-limiting example of a communication system providing wireless communication is a public land mobile network (PLMN) and another non-limiting example is a wireless local area network (WLAN). A non-limiting example of the fixed line system is a public switched telephone network (PSTN).

A communication system typically operates in accordance with a given standard and/or specification which usually sets out what the various elements of a system are permitted to do and how that should be achieved. For example, the standard or specification may define if the user or, more precisely, user equipment, is provided with a circuit switched service or a packet switched service or both. Communication protocols and/or parameters which may be used for the connection are also typically defined. For example, the manner in which communication may be implemented between the user equipment and the elements of the communication networks is typically based on a predefined communication protocol. In other words, a specific set of "rules" on which the communication may be based, in many cases, is preferably defined to enable the user equipment to communicate via the communication system.

The term "service" used above and hereinafter will generally be understood to broadly cover any service and/or goods which a user may desire, require and/or be provided with. The term also may be understood to cover the provision of complimentary services. In particular, but not exclusively, the term "service" will generally be understood to include services provided over an Internet protocol networks, conferencing, telephony, gaming, rich call, presence, e-commerce and messaging, for example, instant messaging.

In a mobile communication system, the users are typically connected to the communication system by radio access entities and/or similar wireless service areas. The access entities are typically referred to as cells. Various user equipment (LE) such as, but not limited to, fixed or portable computers, mobile telephones, personal data assistants or organizers and so on are known to the skilled person and may be used to access the Internet to obtain services via a mobile communication system. Mobile user equipment is often referred to as a mobile station (MS) and may be defined as a means that is capable of communication via a wireless interface with another device such as, but not limited to, a base station of a mobile telecommunication network or any other station. Each mobile user equipment may typically be identified based on a unique identifier, for example, based on the International Mobile Subscriber Identity (IMSI).

Generally, the introduction of Third Generation (3G) communication systems has significantly increased the possibilities for accessing various services on the Internet via mobile user equipment, as well as via other types of user equipment. The third generation systems may be implemented based on, for example, the standards for the GPRS (General Packet Radio Service), WCDMA (Wideband Code Division Multiple Access), TDMA/CDMA (Time Division Multiple Access/Code Division Multiple Access) in UMTS (Universal Mobile Telecommunications System), CDMA 2000, I-Phone and so on.

The 3G Partnership Project (3GPP) has defined a reference architecture for a typical core network which generally provides the users of user equipment with access to services provided via the data communication system. The core network may be based on the use of the general packet radio service (GPRS). The GPRS operation environment commonly includes one or more subnetwork service areas, which are usually interconnected by a GPRS backbone network. A subnetwork typically includes a number of packet data service nodes (SN) which, in this application, will generally be referred to as serving GPRS support nodes (SGSN), each of which is normally connected to the mobile communication network, typically to base station systems by way of radio network controllers (RNC), in such a way that it may provide a packet service for mobile user equipment via several base stations, in other words, cells. The intermediate mobile communication network commonly provides packet-switched data transmission between a support node and mobile data terminals. Different subnetworks are usually, in turn, connected to an external data network, for example, to a public switched data network PSPDN, via GPRS gateway support nodes GGSN. An example of the external data networks is the Internet Protocol (IP) Internet. The GPRS services thus generally allows for packet data transmission between mobile user equipment and external data networks, especially when the cellular network functions as an access network.

In a GPRS network, the mobile user equipment may send a message requesting activation of a packet data protocol (PDP) context in the network. A Serving GPRS support node SGSN typically authenticates the mobile user and usually sends a PDP context creation request to a gateway node GGSN, commonly selected according to a GGSN address stored in the subscriber data and/or according to the access point name given by the user equipment, or to a default GGSN known by the SGSN.

In such a network, a packet data protocol (PDP) context is normally established to carry traffic flows over the network, each PDP context typically including a radio bearer provided between the user equipment and the radio network controller, a radio access bearer provided between the user equipment, the radio network controller and/or the SGSN, and/or switched packet data channels generally provided between the serving GPRS service node and the gateway GPRS service node. Each PDP context may carry more than one traffic flow, but all traffic flows within one particular PDP context are usually treated the same way, at least as regards their transmission across the network. The PDP context treatment requirement is normally based on PDP context treatment attributes associated with the traffic flows, for example, quality of service and/or charging attributes.

The 3GPP communication systems commonly provide sophisticated communication services and/or increased and/or more flexible data transmission capabilities. These improved features may be expected to increase the user friendliness thereof and/or the variety of services available through the mobile communications. However, at the same time, the networks generally become more vulnerable to attacks by malicious users who may try to use the networks for gaining financial and/or other advantage and/or for causing intentional or unintentional damage. Such a malicious user is sometimes referred to by the term "hacker".

There are different possible types of attacks. For example, 'Denial-of-service' attacks normally attempt to prevent the victim from providing and/or receiving a service by crashing and/or overwhelming the service. Exploitation attack is another type which typically attempts to take direct control of a machine. The most common is the 'Trojan horse'. A recently discovered type of attack is generally where subscribers to a 3GPP network may become the target of a malicious activity wherein the hacker aims to take benefit of the subscriber accounts. This type of attack is sometimes referred to as 'over-billing attack'. In this attack the hacker may flood one or a number of arbitrary victims, usually by setting up transmission control protocol (TCP) connections to a server in the Internet which is also commonly controlled by the hacker. The hacker may set up the connection to the Internet from a user equipment connected to a radio access network via networks elements such as, but not limited to, SGSN and/or GGSN and/or a GPRS backbone network.

When the user equipment of the hacker activates the GPRS connection, the PDP context is typically assigned an Internet Protocol (IP) address. A TCP connection may then be opened between the user equipment and the server, both normally controlled by the hacker. The GGSN generally maintains a record wherein the identity of the user equipment is usually linked with the IP address assigned for the user equipment.

When the hacker deactivates the PDP context from his user equipment, he commonly leaves the connection from the server open. The server then typically starts sending acknowledgement packets back to the user equipment. However, at this stage, the user equipment of the hacker has normally already deactivated the PDP context. As a result, the GGSN usually starts dropping the acknowledgement packets from the server and generally clears the record linking the identity of the hacker's user equipment and the IP address.

If a victim user equipment now activates a PDP context with the same GGSN, the GGSN may assign the IP address that was previously assigned for the hacker's user equipment to this user equipment and will typically then start routing the acknowledgement packets from the server to the victim's user equipment. The victim user equipment commonly receives the acknowledgements, but may not react to them. The victim may become liable for the charges for those received packets, even though the victim has not requested them.

Conventionally, the mobile operators have tried to protect the user equipment from different types of attacks by deploying stateful firewalls in the networks, generally for filtering any unwanted connection attempts. When a trusted internal host connects to a transmission control protocol (TCP) socket on another host, a stateful packet inspection filter that normally protects the network usually creates a state. Upon receiving the first message packet to open and establish a TCP connection, in other words, the TCP 'SYN' message, the firewall typically makes an entry in its state table containing the destination socket and/or the source socket. Upon having entered the state information in the table, the firewall then commonly forwards the packet to the destination. When the response comes back, the filter usually simply looks up the stored source and destination sockets in its state table, and if they match an expected response, the firewall generally passes the response packet and any further packets on. If no table entry exists, the packet is normally dropped.

Stateful packet inspection filters may be used similarly to create a state for User Datagram Protocol (UDP) datagrams.

The filter typically removes state table entries when the TCP 'close session' negotiation packets are routed through. Another possibility is to remove the entries based on a timer after a predefined time of inactivity. The timer is usually set to expire after a few minutes. These measures have conventionally been believed to be enough to ensure that no table "holes", as described above, are left open for dropped connections.

Deploying a stateful firewall at the interface between the GGSN and the external networks, such as, but not limited to, the Public Internet, sometimes referred as the Gi interface, will generally prevent most of the attacks. However, such a firewall usually cannot detect or block the "over-billing attack". Once the hacker opens the connection to the malicious server, a state is typically created in the firewall, normally at the Gi interface, allowing packets to be sent between these two nodes. When the hacker disconnects and the IP address is being assigned to a different user, IP packets from the server to that IP address will commonly still pass the firewall at the Gi interface.

It has been proposed that an additional firewall may be deployed between the GGSN and the SGSN. The proposal is usually that the checking firewall send a specific alert message to the filtering firewall in response to, for example, detection of a 'delete PDP context' message associated with a user equipment. Such a mechanism is generally believed to ensure that the state in the firewall at the Gi interface is deleted when the user equipment disconnects from the network and that the packets from the malicious server will therefore be dropped.

The proposed solution, however, is proprietary and typically requires the operator to have an additional hardware, for example, the checking firewall server, at every interface between the SGSN and GGSN. This checking firewall would normally only function for the purpose of detecting and/or blocking the over-billing attacks. For these reasons alone, the operators may not want to go this way, but may rather want to rely on other mechanisms.

It shall be understood that the described over-billing attack in TCP environments is just one of the possible threats. Since there are currently no mechanisms specifying how the elements of the GPRS backbone could inform the stateful firewall at the interface between the GGSN and the Internet if an IP address of a potential victim is still used by a third party, several other similar attacks are possible. As an example of the different attacks, a hacker may have set up a communication with another malicious node who would typically generate UDP traffic. The hacker would then normally disconnect from the network, but the malicious node would generally still generate UDP traffic, thus usually maintaining the states in the firewall at the Gi interface. When the IP address of the hacker is being re-assigned to a different user, this 3GPP user will commonly start receiving UDP datagrams that it has not requested but will typically have to pay for.

SUMMARY OF THE INVENTION

Certain embodiments of the present invention aim to address one or several of the above problems.

According to one embodiment of the present invention, there is provided a method in a communication system for controlling transportation of data. The method normally includes the steps of entering state information, usually associated with a data transportation connection, in a state information record typically maintained in a firewall, the data transportation connection generally being established between a user equipment and a node via a gateway node, and the firewall commonly being configured to control transportation of data based on the state information table, detecting that the data transportation connection is deactivated for the user equipment, sending information from the gateway node that the user equipment cannot be reached, and in response to the information, deleting the state information from the state information record.

A communication system may also be provided. The system commonly includes a gateway node, usually for handling data transportation connections established between user equipment configured to communicate via an access system and nodes connected to a data network, the gateway typically being configured to detect that a data transportation connection for a user equipment is deactivated and to send information that the user equipment cannot be reached, and a firewall normally configured to maintain state information associated with respective data transportation connections established between the user equipment and the nodes, usually via the gateway node and to control transportation of data based on the state information, the gateway commonly being configured to delete state information associated with a user equipment, usually in response to information from the gateway node that the user equipment cannot be reached.

According to certain embodiments, the user equipment communicates via a first packet switched network and the node communicates via a second packet switched network, the gateway typically being located at the first packet switched network and the firewall normally being located at the interface between the first and second packet switched networks. There may also be additional networks supporting user equipment and/or nodes.

According to another embodiment of the present invention, there may be provided a method in a communication system for controlling transportation of data. The method generally includes detecting that an address associated with a data transportation connection established between a user equipment and a node, usually via a gateway node, becomes available for use by other user equipment, and abstaining from reassigning the address for another user equipment, often for a predefined period of time. The gateway node is a common example of the node which abstains from reassigning the address.

A gateway for a communication system is also provided according to certain embodiments, the gateway normally being configured to detect that an address associated with a data transportation connection established between a user equipment and a node, generally via the gateway node, becomes available for use by other user equipment, and, often, to abstain from reassigning the address, usually for another user equipment for a predefined period of time.

According to certain embodiments, the user equipment communicates, commonly via a first packet switched network, and the node communicates, typically via a second packet switched network, the gateway usually being located at the first packet switched network.

Certain embodiments of the present invention may provide a solution to the above mentioned shortcomings of the related art. Certain embodiments provide procedures that improve the security of the users of the modern communications networks such as, but not limited to, the 3GPP networks. Some of the embodiments particularly address attacks such as the over-billing. No modification to the present protocols is necessarily required.

BRIEF DESCRIPTION OF THE DRAWINGS:

To provide a better understanding of certain embodiments of the present invention, reference will now be made, by way of example, to the accompanying drawings in which.

DETAILED DESCRIPTION OF THE PREFERRED EMBODIMENT(S)

Figure 1:
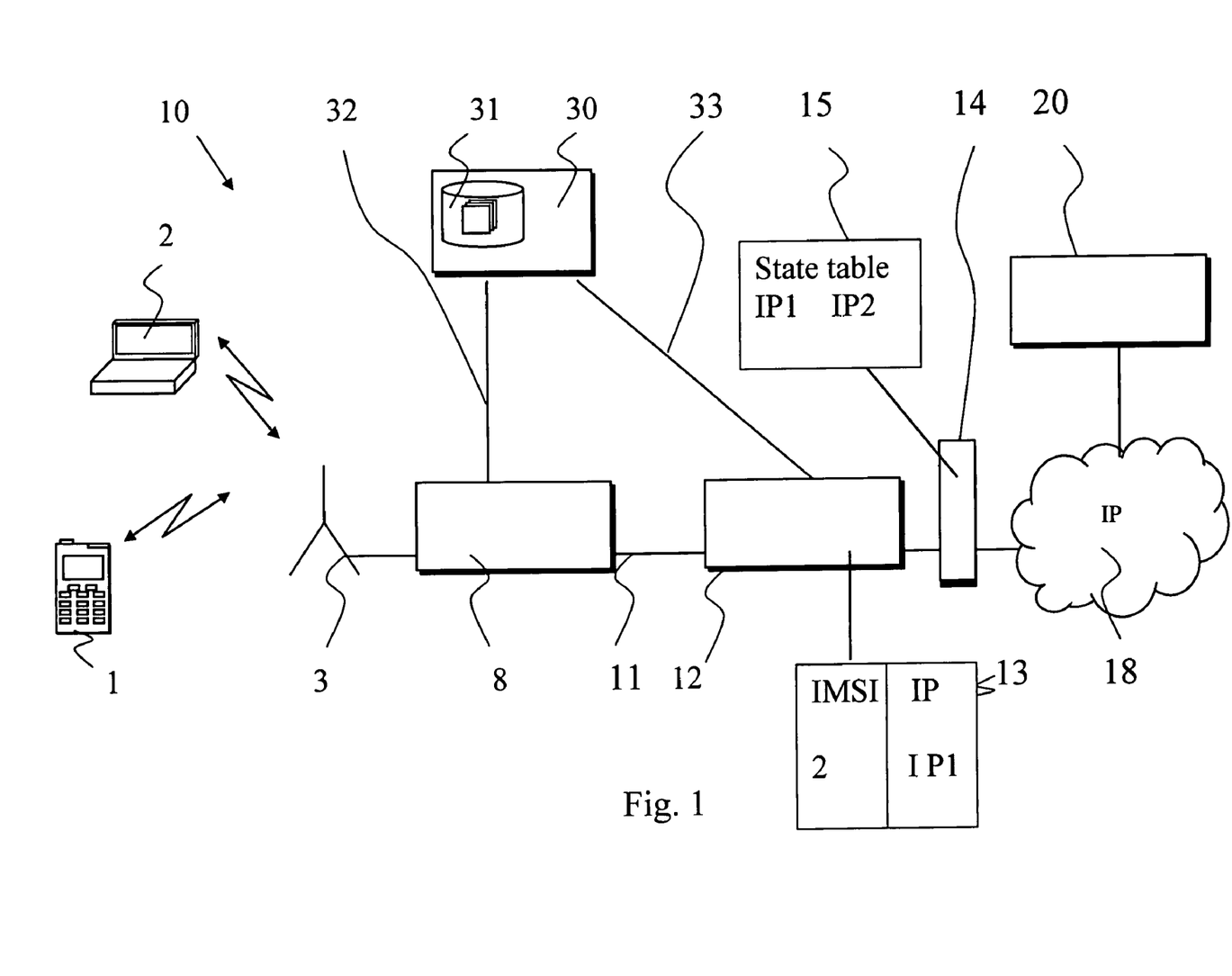
FIG. 1 shows a representative communication system according to certain embodiments of the present invention.

FIG. 1 shows a communication system according to certain embodiments of the present invention. More particularly, certain embodiments of the present invention will be described by way of example, with reference to the architecture of a third generation (3G) mobile communications system. However, it will be understood that certain embodiments may be applied to any other suitable form of network.

FIG. 1 shows a schematic presentation of some elements of a communication system according to certain embodiments of the present invention. The mobile communication system is typically arranged to serve a plurality of mobile user equipment 1 and 2, usually via a wireless interface between the user equipment and base station 3 of the communication system 10.

The basic operational principles of a mobile user equipment, that may also be referenced to as a mobile station, are generally known by those skilled person. A mobile user equipment is normally configured for wireless communication with other stations, typically with the base stations of a mobile communication system for enabling mobility thereof. A mobile user equipment may include an antenna element for wirelessly receiving and/or transmitting signals from and/or to the base stations of the mobile communication network. A mobile user equipment may also be provided with a display for displaying images and/or other graphical information for the user of the mobile user equipment. Speaker means are also typically provided. The operation of the mobile user equipment may be controlled by means of an appropriate user interface, such as control buttons, voice commands and so on. Furthermore, a mobile station is typically provided with a processor entity and/or a memory means. Communication between the user equipment and the entities of the communication network may be based on any appropriate communication protocol. A user may use the mobile user equipment for tasks such as, but not limited to, for making and receiving phone calls, for receiving and sending data from and to the network and for experiencing, for example, multimedia content by means on PDP contexts. For example, a user may access the network by means of a Personal Computer (PC), Personal Data Assistant (PDA), mobile station (MS) and so on.

It shall be appreciated that, although for clarity, only two equipment per base station are shown in FIG. 1, a number of user equipment may be in simultaneous communication with each base station.

A mobile communication system, in turn, may logically be divided between a radio access network (RAN) and a core network (CN). In the simplified presentation of FIG. 1, the base station 3 belongs to the radio access network. It shall be appreciated that, although, for clarity, FIG. 1 shows the base station of only one radio access network, a typical communication network system usually includes a number of radio access networks.

The 3G radio access network (RAN) is typically controlled by appropriate radio network controller (RNC) that is not shown in order to enhance clarity. The radio access network controller is typically connected to an appropriate core network entity or entities such as, but not limited to, a serving general packet radio service support node (SGSN) 8. A user equipment within the radio access network may communicate with a radio network controller via radio network channels which are typically referred to as radio bearers (RB). These radio network channels are normally set up in a mobile telecommunications network in a known manner. Each user equipment 1 and 2 may have one or more radio network channel open at any one time with the radio network controller. The radio access network controller is generally in communication with the serving GPRS support node 8 via an Iu interface. The serving GPRS support node 8, in turn, typically communicates with a gateway GPRS support node 12 via the GPRS backbone network, for example, on a $G_n$, $G_p$ or $G_x$ interface 11. This interface is commonly a switched packet data interface. The serving GPRS support node 8 and/or the gateway GPRS support node 12 normally provide support for GPRS services in the network.

Overall communication between user equipment 1 or 2 in the access entity and the gateway GPRS support node 12 is generally provided by a packet data protocol (PDP) context. Each PDP context usually provides a communication pathway between a particular user equipment and the gateway GPRS support node 12 and, once established, can typically carry multiple flows. Each flow normally represents, for example, a particular service and/or a media component of a particular service. The PDP context therefore often represents a logical communication pathway for one or more flows across the network. To implement the PDP context between user equipment 1 or 2 and the serving GPRS support node 8, radio access bearers RAB are usually established which commonly allow for data transfer across the radio bearer and/or the Iu interface. The implementation of these logical and physical channels is known to those skilled in the art and is therefore not discussed further herein.

The user equipment may connect, via the GPRS network, to servers that are generally connected to an external data network such as, but not limited to, the exemplifying IP network 18. FIG. 1 shows a server 20 that is connected to the IP network 18. This server may be controlled by an hacker, who may also be in control of the user equipment 2.

FIG. 1 also shows a charging entity 30. The charging entity 30 is typically used for charging the subscriber of the user equipment 1. A representative charging entity 30 is shown to provide a database 31 for storing charging accounts and/or similar records for the subscriber 1. Interfaces 32 and 33 are often provided, usually between the charging entity 30 and appropriate network entities, generally for collection of charging data. How a charging entity functions is known to those skilled in the art of the present invention. A designated charging entity in the network normally uses a stored tariff to determine a charge for a call and/or other session, usually based on the duration of the session. The modern charging entities commonly enable numerous possibilities for charging, such as, but not limited to, a fixed monthly fee up to a certain amount of charges and an extra charge for any use in the excess of the monthly "free" time. Each subscriber typically has a charging account with the operator of the network. The charge for a session may then be allocated to the charging account of the user that may also be associated with the use of resources of the network. When a session is in progress, the network may use the tariff to allocate charges due with respect to the session and/or use of other services. In a post paid arrangement, the charges for use of the communication services are typically charged afterwards for a specified period of time, such as monthly. In pre-paid accounts, the charges are normally collected beforehand.

FIG. 1 also shows a representative stateful firewall entity 14 located between the GGSN 14 and the IP data network 18. The firewall may be located at the so called Gi interface between the GPRS and IP networks. The stateful firewall 14 is usually configured for filtering unwanted connection attempts, typically based on a state information record and/or table 15. The stateful packet inspection filter may thus be used to protect the 3GPP user equipment, commonly by means of the entry state information in its table, normally allowing packets corresponding to sessions for which information is found to pass the firewall.

Packets may be filtered on the IP addresses of the source and/or destination and/or the port numbers. Upon receiving the initial TCP message, in other words, the SYN packet for starting and establishing TCP communications, the firewall 14 generally makes an entry in its state table containing a destination socket and/or a response socket, and then typically forwards the packet to the destination. For further packets to or from the user equipment, the filter then usually looks up the packet's source and/or destination sockets in the state table 15. If these match an expected response, the firewall 14 normally passes the packet on. If no table entry exists, the packet is usually dropped.

The following describes, in more detail, an embodiment wherein the state information stored in the firewall entity 14 for addresses not in use anymore is purged. The description refers to prevention of over-billing or similar attacks, but it should be understood that other embodiments may be used for prevention of any attacks, especially those wherein the hacker might try to utilize the unclear situation regarding the states of the user equipment involved.

Figure 2:
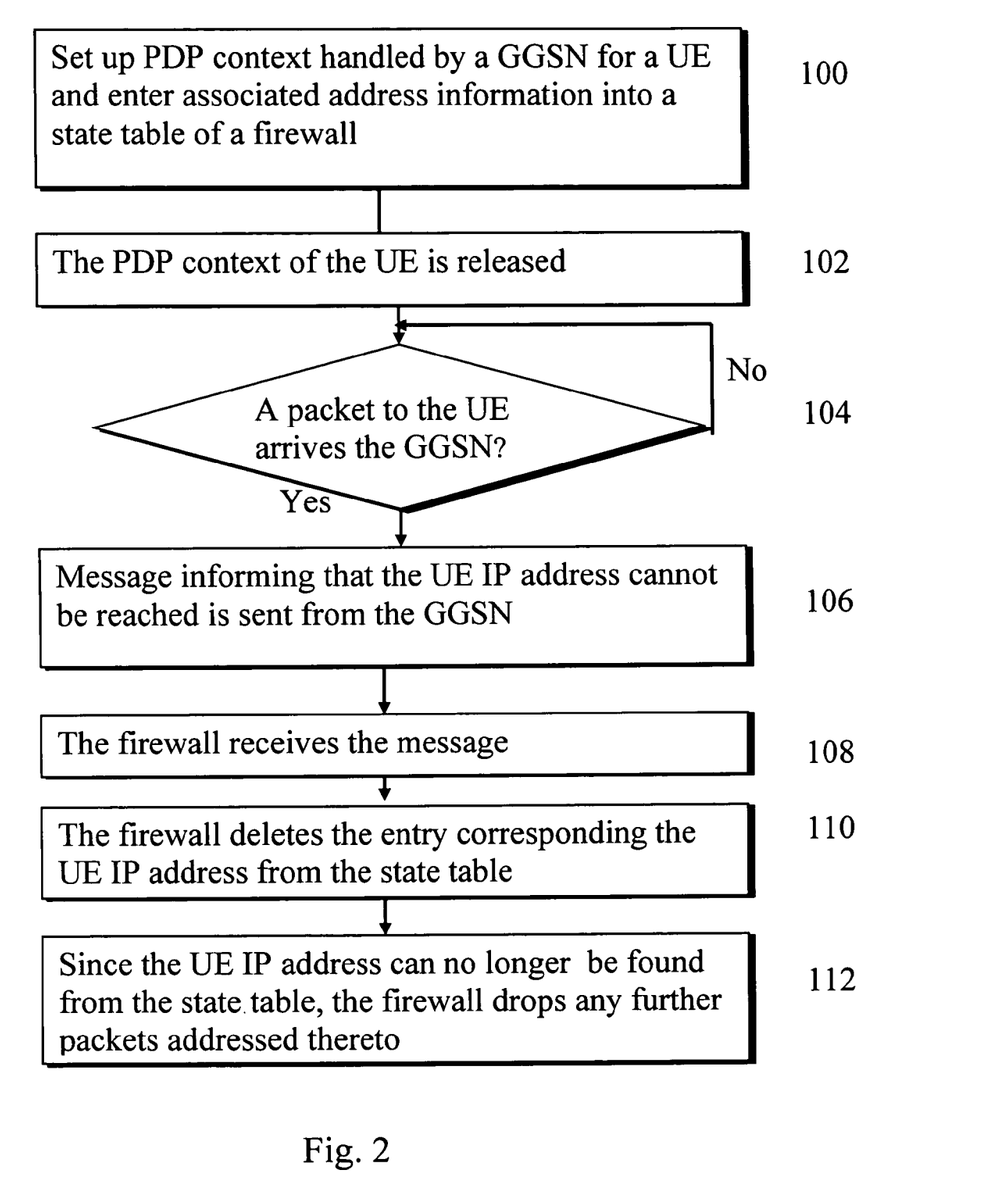
FIG. 2 is a flowchart illustrating the operation of one embodiment of the present invention.

The following describes, with reference to FIGS. 1 and 2, mechanisms that normally rely on the signaling protocol used for communication between the GGSN and the firewall nodes 12 and 14, respectively, for purging the state information 15 typically stored in the firewall 14 for addresses which are not used anymore. The example is described using ICMPv6 (Internet Control Message Protocol for the Internet Protocol Version 6) as the signaling protocol. However, it shall be appreciated that other protocols may also be used. For example, the signaling protocol may be based on the MIDCOM (middlebox communications) protocol.

FIG. 2 shows at least some of the main steps in accordance with a first embodiment. The step 100, wherein a PDP context is usually set up and an IP address is normally assigned for the user equipment 2, is not described in detail, as this step may be accomplished based on any appropriate manner that complies with the particular standards and protocols.

At step 102, an IP address of the user equipment 2 is typically released by the user equipment (UE). This may be done, for example, by means of 'Deactivate PDP context' message. If the GGSN 12 receives a further IP packet addressed to the IP address of the user equipment at step 104, the GGSN 12 normally recognizes that the PDP context for the requested IP address has been deactivated. The GGSN 12 may then send, at step 106, an ICMP 'Destination Unreachable' message, commonly addressed to the origin of the packet at the inner interface of the firewall 14. The inner interface generally refers to the interface of the firewall connected to the protected network. The interface of the firewall connected to the external networks is thus usually referred to as the outer interface.

Upon receiving the 'ICMP Destination unreachable' message at step 108, the firewall 14 maintaining the state information table 15 associated with the deleted PDP context typically deletes, at step 110, all state table entries corresponding to the indicated IP address.

The above generally refers to applications where IP addresses are used. However, this is not the only possibility. In some applications, each PDP context may need to be allocated an address. The state entries may then correspond to the PDP address. This address may be at least one IP address that may be derived from a prefix and/or similar indicators. For example, 3GPP Technical Specification TS 23.060 defines a dynamic address allocation procedure. The dynamic address allocation may be used to support stateless address autoconfiguration mechanism, as generally defined by the Internet Engineering Task Force (IETF), usually within the particular context of UMTS such as, but not limited to, point-to-point connections, radio resource efficiency, and so on. In this type of operation, the GGSN normally assigns a prefix, rather than an IP address, that is unique within its scope to each PDP context applying stateless address autoconfiguration. An IP address may later on, if required, be derived from the prefix. The size of the prefix may be defined, for example, in accordance with the maximum prefix length for a global address. This typically avoids the necessity of performing duplicate address detection at the network level for every address built by the user equipment.

Thus, in certain applications of the 3GPP, such as, but not limited to, certain UMTS applications, the user equipment may not be assigned with an IP address, but rather with a prefix that the user may use to derive several IP addresses. In such cases, the firewall 14 at the Gi interface is preferably configured to delete all the states corresponding to this IP prefix.

Once the entry, and thus address information associated with the user equipment 2 at the table 15 maintained at the firewall 14, is deleted, any attempts to use the address or addresses created for the user equipment 2 at step 100 are usually blocked by the firewall 14 at step 112. The packet typically received at step 102 and normally triggering the deletion is generally dropped by the GGSN 12. Therefore, although this address might be assigned to the user equipment 1, any packets from the server 20 to this address would usually not pass the firewall 14 after the deletion of the entry at the table.

Another embodiment addressing the allocation/reallocation of addresses protected by a firewall will now be discussed.

In a further embodiment, the GGSN 12 generally does not re-assign an IP address or IP prefix to a different user after a user equipment has released it, for example, after a PDP context is de-activated or a connection is dropped, generally for a predetermined length of time. Preferably, the prefix is not reassigned for at least as long as the firewall maintains any state information for UDP/TCP sessions.

In accordance with certain embodiments, in order to make sure that all corresponding states are deleted from the state table, the GGSN may wait and send at least one error message, for example, an ICMPv6 'Error' message, before re-assigning the prefix or IP address to a different user.

The number of messages to be sent from the GGSN 12 to the firewall may be configurable by the operator. This may make the solution even more robust, for example, in the case of lost packets. The GGSN 12 may, for example, wait to send three ICMPv6 'Destination Unreachable' messages before re-assigning the prefix or IP address.

This further embodiment may be implemented independently of the presence of any firewalls. In a simplified form, the GGSN does not generally re-assign the address, as long as it keeps receiving packets to this IP address or prefix. This type of operation may be preferred, for example, in applications where the GGSN is not aware of the presence of any firewalls.

The following is another example how the 'over-billing' attacks may be blocked in a system wherein a timer is provided in the gateway node. The expiry time of the timer is preferably dependent on the state entry deletion times of the associated stateful packet inspection filter. Assuming that, at time t0, the user equipment 2 releases its PDP context, an inactivity timer in the GGSN has commonly been set to have a value T, T normally being the time after which the state entry will be deleted from table 15. Also assuming a TCP or UDP communication between the 3GPP user equipment 2 and the server 20, the user equipment 2 may normally be identified at the application layer by identity 1. The server is typically assigned with an IP address IP2.

If a packet is sent from IP2, usually the address of the server 20, to address IP1 at time t1, such that (t1-t0)>T, the timer in the stateful packet inspection packet filter normally would have expired, the state would normally have been deleted and the packet is generally dropped at the firewall. Such a packet is commonly a packet for user equipment 2 since, according to the above described requirements, the GGSN 12 typically should not re-assign this IP address to any other node before the expiry of T.

However, if a packet is sent from IP2 to IP1 at time t1, such that (t1−t0)<T, the firewall 14 will usually let the packet pass, but the GGSN 12 generally should send an ICMPv6 Destination Unreachable back to the server 20, in other words, to the address IP2, and drop the invoking packet. Upon receiving this ICMPv6 Error message from the inner interface, the firewall 14 commonly deletes all state entries at the table 15 corresponding to this IP address, thus typically ensuring that subsequent packets sent to IP1 will be dropped. When the states corresponding to user equipment 2 have been deleted in the firewall 14, the GGSN 12 may then re-assign this IP address to a different node. New state entries will then usually be created in the firewall, usually to allow communications to and from this new user, such as user equipment 1.

When practicing certain embodiments of the present invention, a modification to the existing stateful packet inspection packet filters implementation in firewalls may be highly preferable or even required, such as to configure the filter to remove at least substantially all the state entries corresponding to the indicated IP address and/or IP Prefix in response to receiving a unreachable message from the inner interface. The GGSN may also need to be modified to support the appropriate signalling protocol.

It should be appreciated that whilst embodiments of the present invention have been described with relation to user equipment such as mobile stations, embodiments of the present invention are applicable to any other suitable type of user equipment.

The data is generally described above as being in packet form. In alternative embodiments of the invention, the data may be sent in any suitable format.

Certain embodiments of the present invention have been described in the context of a GPRS backbone network. Other embodiments are also applicable to any other packet data communication networks.

It is also noted herein that, while the above describes exemplary embodiments of the invention, there are several variations and/or modifications which may be made without departing from the scope of certain embodiments of the present invention, at least as defined in the appended claims.

We claim:

1. A method, comprising:
   entering state information associated with a packet data protocol connection in a record maintained in a firewall, the packet data protocol connection being established between a user equipment and a node via a gateway node, and the firewall being configured to control transportation of packet data protocol data based on the record, and the gateway node being configured to, when deactivation of the packet data protocol connection for the user equipment is detected, send information to the firewall that the user equipment cannot be reached;
   receiving in the firewall the information that the user equipment cannot be reached;
   in response to receiving said information, deleting the state information from the record; and
   dropping any remaining packet data protocol data associated with said address comprising freezing use of an address associated with the packet data protocol connection from use by other data transportation connections for a predetermined period of time after detecting that the packet data protocol connection is deactivated.

2. The method of claim 1, wherein the user equipment is configured to communicate via a first packet switched network, the node is configured to communicate via a second packet switched network, the gateway node is located at the first packet switched network, and the firewall is located at an interface between the first and second packet switched networks.

3. The method of claim 1, wherein the gateway node is further configured to send the information from the gateway node to the node.

4. A method, comprising:
   detecting, by a gateway node, that an address associated with a packet data protocol connection established between a user equipment and a node via the gateway node becomes available for use by other user equipment, wherein state information associated with a packet data protocol connection is entered in a record maintained in a firewall, said state information comprising said address, the firewall being configured to control transportation of packet data protocol data based on the record;
   sending information to the firewall that the user equipment cannot be reached; and
   abstaining from reassigning the address for another user equipment for a predefined period of time wherein any remaining packet data protocol data associated with said address are dropped.

5. The method of claim 4, wherein, the user equipment is configured to communicate via a first packet switched network, and the node is configured to communicate via a second packet switched network, and the gateway node is located at the first packet switched network.

6. A gateway node comprising a first processor configured to handle packet data protocol connections established between user equipment configured to communicate via an access system and nodes connected to a data network, the gateway node being configured to detect that a packet data protocol connection for a user equipment is deactivated and to send information to the firewall that the user equipment cannot be reached; and
   a data processing node comprising a second processor configured to maintain state information associated with respective packet data protocol connections established between the user equipment and the nodes via the gateway node and to control transportation of data based on the state information, the data processing node being configured to delete state information associated with a user equipment in response to information from the gateway node that the user equipment cannot be reached.

7. An apparatus, comprising:
   a processor; and
   a memory and the computer program code,
   the memory and the computer program code configured to, with the processor, cause the apparatus at least to:
   detect that an address associated with a packet data protocol connection established between a user equipment and a node via a gateway node becomes available for use by other user equipment, wherein state information associated with a packet data protocol connection is entered in a record maintained in a firewall, said state information comprising said address, the firewall being configured to control transportation of packet data protocol data based on the record,
   send information to the firewall that the user equipment cannot be reached, and
   abstain from reassigning the address for another user equipment for a predefined period of time following said detection that said address becomes available for use by said other user equipment, wherein any remaining packet data protocol data associated with said address are dropped.

8. The apparatus of claim 7, comprising an inactivity timer, expiry of the inactivity timer providing indication of an end of the predefined period.

9. An apparatus, comprising:
   a processor; and
   a memory including computer program code,
   the memory and the computer program code configured to, with the processor, cause the apparatus at least to
   enter state information associated with a packet data protocol connection in a record maintained in a firewall, the packet data protocol connection being established between a user equipment and a node via a gateway node, and the firewall being configured to control transportation of data based on the record;
   receive information from the gateway node that the user equipment cannot be reached when the packet data protocol connection is deactivated for the user equipment; and
   in response to said information, delete the state information from the record and to drop any remaining packet data protocol data associated with an address comprising freezing use of the address associated with the packet data protocol connection from use by other data transportation connections for a predetermined period of time after detecting that the packet data protocol connection is deactivated.

10. A computer-readable storage medium encoded with instructions configured to control a processor to perform a process, the process, comprising:
   entering state information associated with a packet data protocol connection in a record maintained in a firewall, the packet data protocol connection being established between a user equipment and a node via a gateway node, and the firewall being configured to control transportation of data based on the record, and the gateway node being configured to, when deactivation of the packet data protocol connection for the user equipment is detected, send information that the user equipment cannot be reached;
   receiving in the firewall the information that the user equipment cannot be reached; and
   in response to receiving said information, deleting the state information from the record, and dropping any remaining packet data protocol data associated with an address comprising freezing use of the address associated with the packet data protocol connection from use by other data transportation connections for a predetermined period of time after detecting that the packet data protocol connection is deactivated.

11. A computer-readable storage medium encoded with instructions configured to control a processor to perform a process, the process, comprising:
   detecting, by a gateway node, that an address associated with a packet data protocol connection established between a user equipment and a node via the gateway node becomes available for use by other user equipment, wherein state information associated with a packet data protocol connection is entered in a record maintained in a firewall, said state information comprising the address, the firewall being configured to control transportation of packet data protocol data based on the state information record;
   sending information that the user equipment cannot be reached; and
   abstaining from reassigning the address for another user equipment for a predefined period of time, wherein any remaining packet data protocol data associated with said address are dropped.

* * * * *

UNITED STATES PATENT AND TRADEMARK OFFICE
CERTIFICATE OF CORRECTION

PATENT NO. : 7,620,808 B2  
APPLICATION NO. : 10/768075  
DATED : November 17, 2009  
INVENTOR(S) : Le et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Twenty-sixth Day of October, 2010

David J. Kappos  
*Director of the United States Patent and Trademark Office*

UNITED STATES PATENT AND TRADEMARK OFFICE
CERTIFICATE OF CORRECTION

PATENT NO.        : 7,620,808 B2                                     Page 1 of 1
APPLICATION NO.   : 10/768075
DATED             : November 17, 2009
INVENTOR(S)       : Le et al.

It is certified that error appears in the above-identified patent and that said Letters Patent is hereby corrected as shown below:

Column 12,
Line 26, "and the" should read --including--.

Signed and Sealed this
Fourteenth Day of June, 2011

David J. Kappos
*Director of the United States Patent and Trademark Office*